United States Patent
Neal et al.

(10) Patent No.: US 7,215,553 B2
(45) Date of Patent: May 8, 2007

(54) COMPUTER HOUSING WITH REMOVABLE LIGHT PIPE

(75) Inventors: Thomas S. Neal, Cupertino, CA (US); Kai Ming Ng, San Jose, CA (US); Guillermo Andres, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 10/970,138

(22) Filed: Oct. 20, 2004

(65) Prior Publication Data
US 2006/0083018 A1   Apr. 20, 2006

(51) Int. Cl.
*H05K 5/00* (2006.01)
(52) U.S. Cl. ...................... 361/724; 362/551
(58) Field of Classification Search ............... 362/551
See application file for complete search history.

(56) References Cited

U.S. PATENT DOCUMENTS

| | | | | |
|---|---|---|---|---|
| 5,604,662 A * | 2/1997 | Anderson et al. | ........... | 361/685 |
| 5,646,816 A * | 7/1997 | Alden et al. | ................. | 361/622 |
| 5,877,938 A * | 3/1999 | Hobbs et al. | ................ | 361/724 |
| 5,938,324 A * | 8/1999 | Salmon et al. | .............. | 362/555 |
| 6,231,224 B1 * | 5/2001 | Gamble et al. | ............. | 362/551 |
| 6,428,216 B1 * | 8/2002 | Savage, Jr. | .................. | 385/88 |
| 6,906,918 B2 * | 6/2005 | Rabinovitz | ................... | 361/687 |
| 2002/0033897 A1 * | 3/2002 | Mayne et al. | ............... | 348/373 |
| 2004/0090749 A1 * | 5/2004 | McKinnon et al. | ......... | 361/724 |
| 2005/0135069 A1 * | 6/2005 | King et al. | ................. | 361/727 |

FOREIGN PATENT DOCUMENTS

EP   0426330   5/1994

\* cited by examiner

*Primary Examiner*—Lisa Lea-Edmonds

(57) ABSTRACT

A computer housing, removable light pipe device, and method for assembling a computer are disclosed. The computer housing has a drive door assembly and a light pipe. The light pipe is removably coupleable with the drive door assembly.

18 Claims, 7 Drawing Sheets

COMPUTER HOUSING WITH REMOVABLE LIGHT PIPE

TECHNICAL FIELD

An embodiment of the present invention relates to the field of housings for computers. More specifically, embodiments of the present invention relate to a computer housing with a removable light pipe.

BACKGROUND

Computers such as a personal computer (PC), workstation computers, etc. and similar electronic apparatus, instruments, etc. are typically housed in a protective structure. Such computer housings function to protect and support components of the computer within their enclosure. Protection is provided against moisture, dirt, dust, and other environmental contaminants, and potentially disturbing mechanical and electrical contact with outside objects.

For instance, modern computer components such as processors, memory, etc. typically comprise field effect transistors and other devices that tend to be very sensitive to damage with spurious electrostatic discharges. Thus, computer housings are typically electrically grounded, and may also so function as a convenient chassis based ground reference for some electrical components of the computer housed therein. Further, in as much as some electrical components of the computer housed within can operate at hazardous voltage levels, in ensconcing the components, computer housings provide the added beneficial function of isolating them from outside, thus protecting humans from dangerous accidental contact therewith.

Computer housings typically have a case for enclosing the computer and a sturdy frame which supports the case and components of the computer. The case can have a number of panels, such as a front and a back, a top and a bottom, and a left and a right side, etc. On some computer housings, one or more of the panels, e.g., the front panel, can provide access, indication, and/or interfacing with computer components internal to the computer housing, e.g., supported by its frame.

Common computer components include drives for accessing removable media, such as to store and/or retrieve data and/or programs, etc. thereon. Such drives can include magnetic drives and optical drives. Optical drives allow the computer to function with optical media such as a compact disk (CD), a digital versatile disk (DVD), etc. Typical optical drives are accessed by mechanically, electromechanically, etc. operating an eject button, which allows the optical medium to be installed and/or removed from the drive and provide indication relating to an operation of the drive with a light emitting diode (LED).

Computer housings, e.g., a front panel thereof, allow the eject button to be operated by a user, e.g., by actuating an externally accessible eject button actuator, which can mechanically actuate the internally housed drive component's eject button. A drive door component of the computer housing opens with responsive action of the internal drive, such as to eject and/or accept a CD, DVD, etc.

Computer housings allow external display to the user of indication relating to an operation of the internal drive, such as by coupling light emitted by the LED thereof to the outside of the housing, e.g., a front panel thereof. For any of various component configuration, aesthetic, and operational related reasons, the external display may be displaced in one or more spatial aspects (e.g., configuration, position, etc.) from the LED. For instance, the LED may be in a corner of the drive proximate to a front inside corner of the computer housing, and the indication provided in the middle of the front panel, or closer to the side of the front panel opposite from the side proximate to the inside front corner of the LED. A light pipe can be used to couple the light emitted by the drive's LED to a position on the front or other panel of the computer housing at which the user's indication is to be provided.

Conventional light pipes, used in conventional computer housings, are securely installed during the manufacturing, fabrication, assembly, etc. of the computer. In this conventional arrangement however, it can be difficult to remove an installed light pipe without damaging the light pipe, the computer housing component to which it is attached, or both.

A variety of conventional light pipes may be installable with a particular conventional computer housing. Not all of the various light pipes will function properly in a particular installation. However, conventional light pipes are not labeled for a designated installation. This can cause confusion, mis-selection, and mis-installation (e.g., choosing the incorrect light pipe for a particular installation and installing the incorrect light pipe in that installation).

Once installed, replacing the mis-selected/mis-installed light pipe with the correct light pipe for that installation requires removal of the mis-selected/mis-installed light pipe. As discussed above, this can cause damage to the light pipe, to another computer housing component, or both.

Conventional light pipes can be installed with conventional computer housings in several possible configurations. However, not all of the possible configurations will allow the conventional light pipe to function properly in a particular installation. Once installed, reconfiguring the mis-configured light pipe into the correct configuration for that light pipe in that installation requires removal of the mis-configured, thus mis-installed light pipe. As discussed above, this can cause damage to the light pipe, to another computer housing component, or both.

SUMMARY

A computer housing, removable light pipe device, and method for assembling a computer are disclosed. The computer housing has a drive door assembly and a light pipe. The light pipe is removably coupleable with the drive door assembly.

BRIEF DESCRIPTION OF THE DRAWINGS

The accompanying drawings, which are incorporated in and form a part of this specification, illustrate embodiments of the invention and, together with the description, serve to explain the principles of the invention. The drawings are not to scale.

DETAILED DESCRIPTION

A computer housing, removable light pipe device, and method for assembling a computer are disclosed. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus, etc. have not been described in detail so as not to unnecessarily obscure aspects of the present invention.

A portion of the detailed description that follows is presented and discussed in terms of a process. Although steps and sequencing thereof are disclosed in a figure herein (e.g., FIG. 8) describing the operations of this process (e.g., process 80), such steps and sequencing are exemplary. Embodiments of the present invention are well suited to performing various other steps or variations of the steps recited in the flowchart of the figure herein, and in a sequence other than that depicted and described herein.

Embodiments of the present invention provide a computer housing, removable light pipe device, and method for assembling a computer. In one embodiment, the computer housing has a drive door assembly and a light pipe. The light pipe is removably coupleable with the drive door assembly. In one embodiment, in a coupled aspect, a structural characteristic of the drive door assembly secures the light pipe therewith. In one embodiment, the light pipe is labeled for one installation. In one embodiment, the light pipe is configured for one installation configuration.

Therefore, embodiments of the present invention allow a light pipe to be removed, decoupled, etc. from a computer housing without damage to the light pipe or to another component of the computer housing. Confusion, mis-selection, incorrect configuration, and mis-installation of a light pipe, are deterred with light pipes and computer housings according to embodiments of the present invention. Further, in the event of incorrect configuration and/or mis-installation of a light pipe according to an embodiment of the present invention, the mis-installed or mis-configured light pipe can be readily removed and replaced without damaging the light pipe and/or another component of the computer housing.

Exemplary Computer Housing

Figure 1:
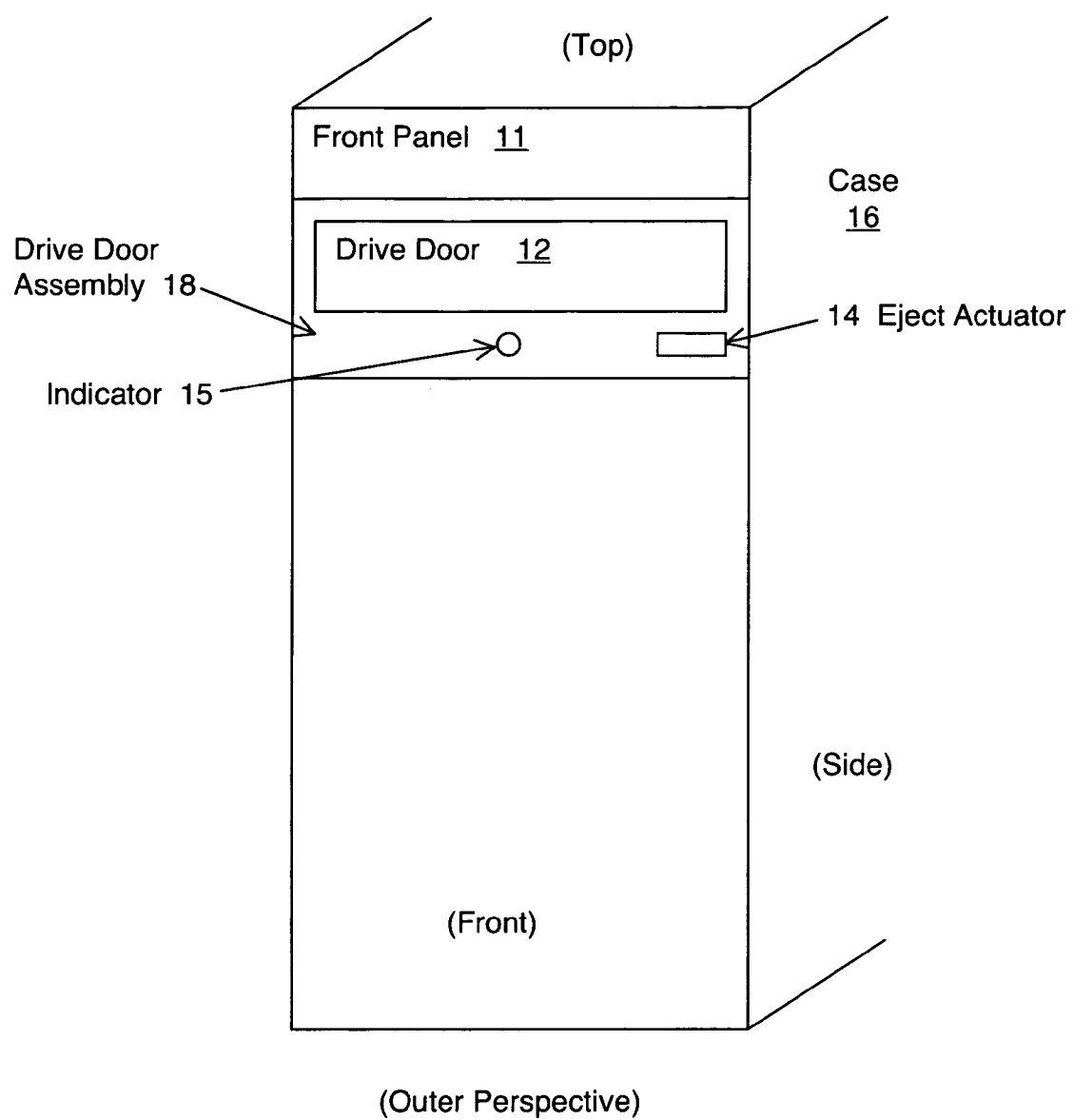
FIG. 1 depicts an exemplary computer housing, according to an embodiment of the present invention, from an outer perspective.

FIG. 1 depicts an exemplary computer housing 10, according to an embodiment of the present invention, from an outer perspective. Computer housing 10 has a front panel 11. Front panel 11 couples with a case 16 and functions as a protective front surface for computer housing 10, which allows users to access and interface with components internal to the computer housing 10, such as drives.

Figure 2:
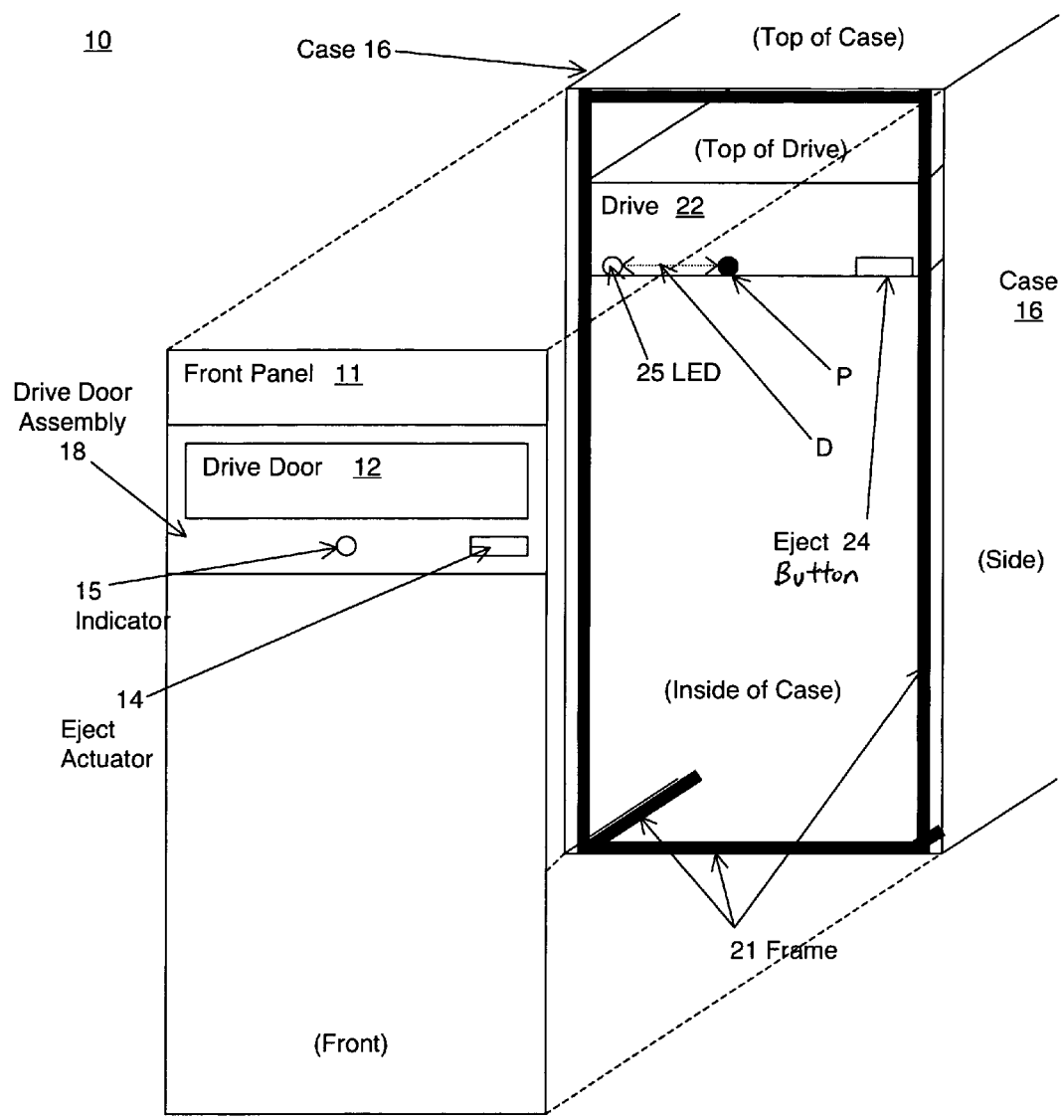
FIG. 2 depicts an exemplary computer housing, according to an embodiment of the present invention, from an exploded perspective.

For instance, front panel 11 has a drive door assembly 18 for accessing and interfacing with an internal drive (e.g., drive 22; FIG. 2). Drive door assembly 18 has a drive door 12 for accessing an internal drive, an eject actuator 14 for interfacing with the internal drive to cause drive door 12 to operate, and an indicator 15 for displaying a visual indication relating to the operation of the internal drive. Drive door assembly 18 can be a component of, integral with, etc. front panel 11.

It is appreciated that embodiments of the present invention may be practiced with functionality, exemplified herein with reference to front panel 11, wherein the computer housing is configured, oriented, etc. in such a way that the functionality is oriented to an aspect (e.g., direction, position, orientation, etc.) other than the front of the computer housing. It is further appreciated that the computer housing exemplified herein with reference to computer housing 10 can have any shape, size, configuration, orientation, etc., and can house any kind of computer, instrument, electronic apparatus, etc.

FIG. 2 depicts exemplary computer housing 10, according to an embodiment of the present invention, from an exploded perspective. Case 16 and front panel 11 couple and are structurally supported with a sturdy frame 21. Frame 21 supports, mounts, etc. one or more drives 22 (e.g., and other components).

Drive 22 is a drive for an optical medium such as a compact disk (CD), a digital versatile disk (DVD) with which data and program storage and/or retrieval such as reading, writing, and read/write operations, etc. can be performed. Drive.22 has a light emitting diode (LED) 25, which illuminates to indicate an operation thereof. For instance, LED 25 can illuminate responsive to drive 22 performing a read or a write operation, etc.

Drive 22 also has an eject button 24, which when actuated, causes the drive to eject (e.g., or accept) media, such as a CD, DVD, etc. With front panel 11 in place with case 16, drive door assembly is positioned proximate to drive 22 such that eject actuator 14 actuates eject button 24 responsive to a user action.

With front panel 11 in place with case 16, drive door assembly 18 is positioned proximate to drive 22 such that indicator 15 provides indication responsive to LED 25 illuminating, which displays the indication provided by LED 25 outside of computer housing 10, e.g., in front of front panel 11. With front panel 11 in place with case 16, drive door assembly 18 is positioned proximate to drive 22 such that indicator 15 is proximate to a position P on drive 22, which is a distance D away from LED 25.

Figure 3:
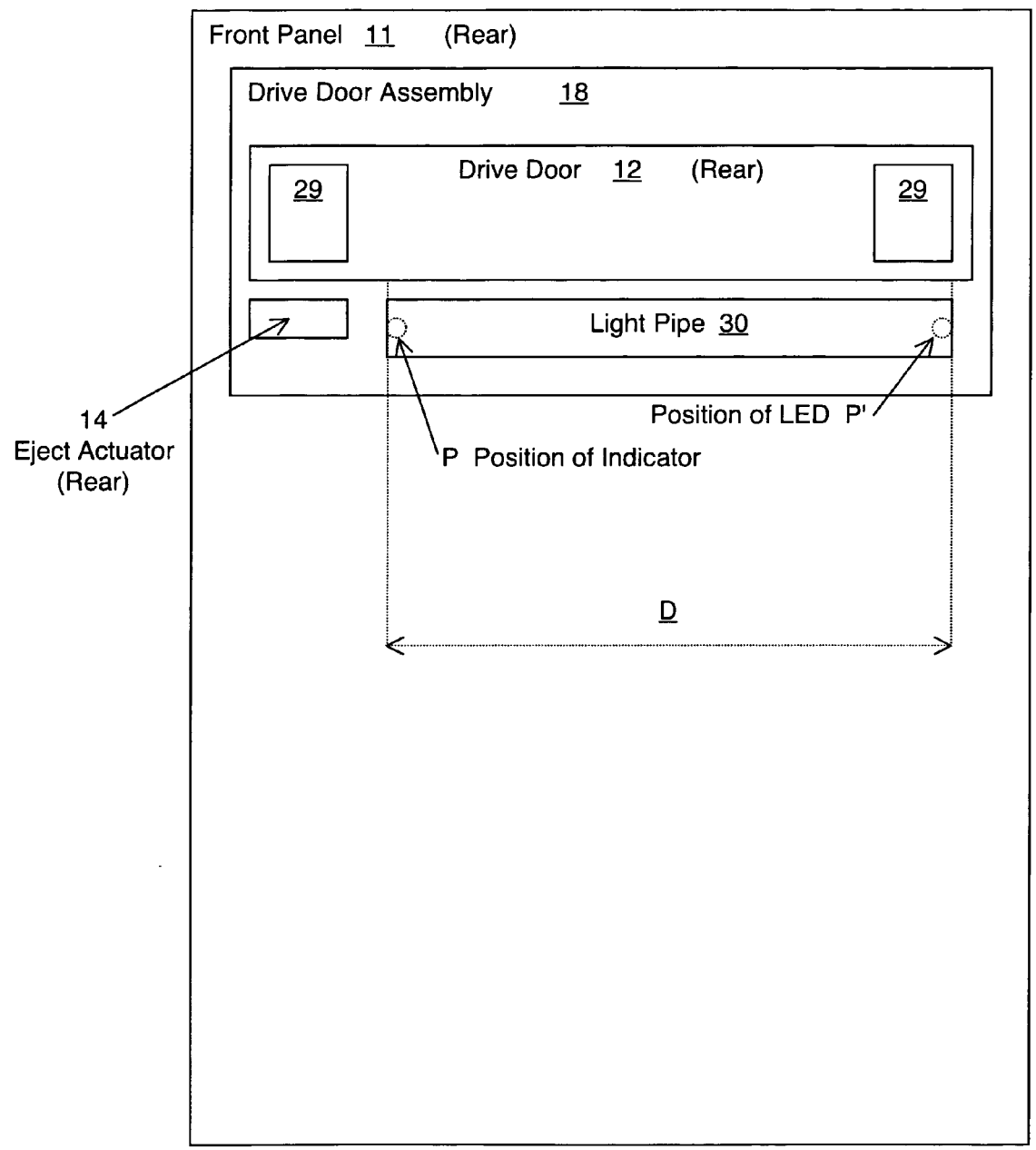
FIG. 3 depicts an exemplary front panel for a computer housing, according to an embodiment of the present invention, from a rear perspective.

FIG. 3 depicts exemplary front panel 11, according to an embodiment of the present invention, from a rear perspective. The eject button 24 is below drive door 12 wherein, with front panel 11 in place with case 16, drive door assembly 18 is positioned such that the rear of eject actuator 14 is proximate to ejection button 24 sufficient to actuate eject button 24 responsive to a user action, e.g., pressing the front accessible side of eject actuator 14 (FIG. 1, 2).

Drive door 12 has one or more components 29 such as ramps, with which it can be operated with drive 22 (FIG. 2). Drive door 12 can also be spring actuated, spring assisted, etc. and/or can function with other mechanical components (e.g., ledges, levers, cams, gears, surfaces, etc.), with electromechanical components, etc.

Drive door assembly has a light pipe 30 for transmitting light emitted by LED 25 (FIG. 2) to indicator 15 (FIG. 1, 2). With front panel 11 in place with case 16, drive door assembly 18 is positioned such that light pipe 30 conducts light emitted by LED 25 at position P' to be displayed with indicator 15 at position P. From the perspective depicted, one end of light pipe 30 covers indicator 15 at position P and its other end faces position P'. Light pipe 30 thus has a length corresponding to the distance D, e.g., the horizontal distance between LED 25 and indicator 15 with respect to front panel 11.

Exemplary Light Pipe & Installation

Figure 4:
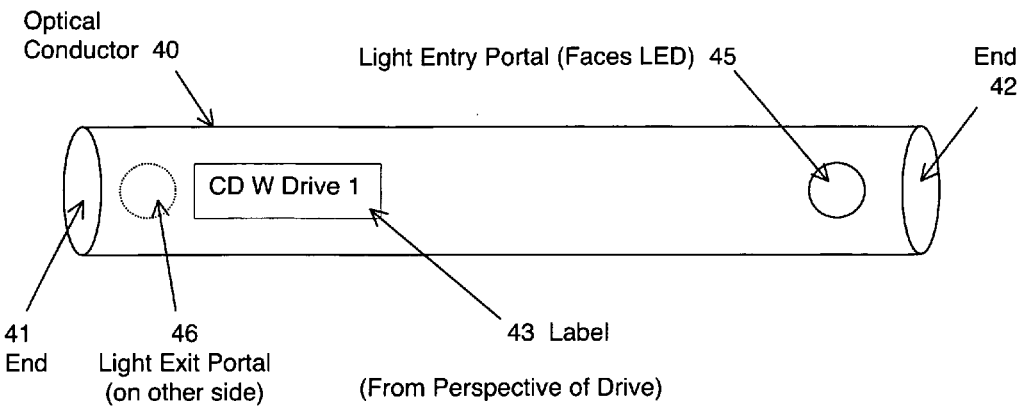
FIG. 4 depicts an exemplary removable light pipe, according to an embodiment of the present invention.

FIG. 4 depicts an exemplary removable light pipe 30, according to an embodiment of the present invention. Light pipe 30 has an optical conductor 40 with a first end 41 and a second end 42. Light enters optical conductor 40 at an optical entry portal 45, proximate to end 42. Optical conductor 40 is of a material, configuration, structure, etc. having optical qualities sufficient for coupling light entering at optical entry port 45 to an optical exit portal 46, which is proximate to end 41. In one embodiment, light pipe 30 has a label 43 with which it is identified. Label 43 can be lased, inscribed, or etched into, affixed to, written on, etc. an outer surface of optical conductor 40, in any position and in such a way that it does not interfere with the optical conduction function thereof.

In one embodiment, optical conductor 40 has a substantially cylindrical shape configuration wherein ends 41 and/or 42 have substantially circular, ellipsoidal, etc. contours. In one embodiment, optical conductor 40 comprises a transparent plastic, glass, or material of similar optical properties.

Figure 5:
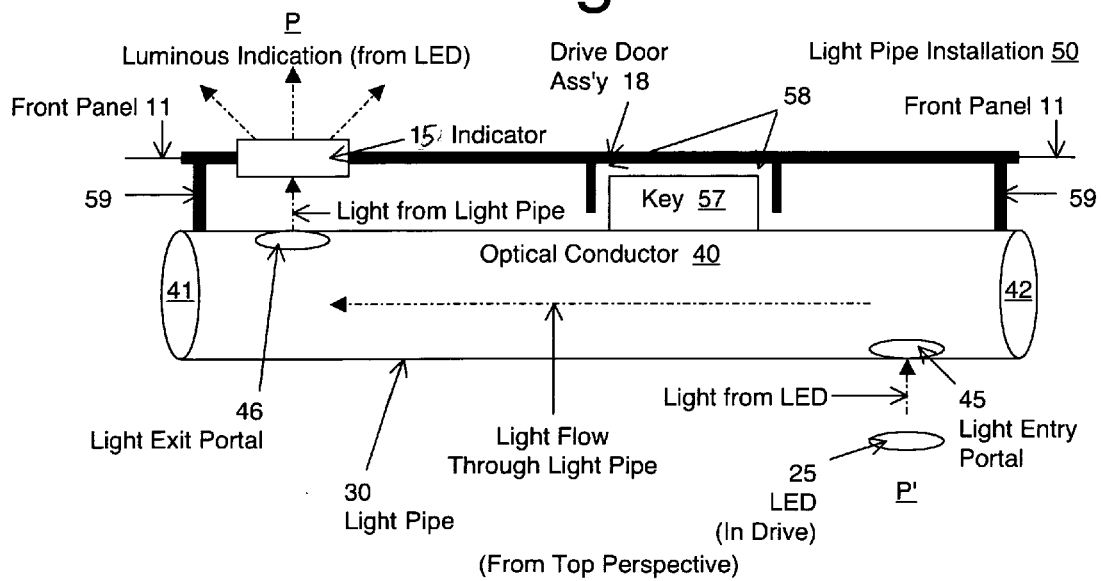
FIG. 5 depicts an exemplary light pipe installation, according to an embodiment of the present invention.

FIG. 5 depicts an exemplary light pipe installation 50, according to an embodiment of the present invention. In installation 50, light pipe 30 couples with the drive door assembly 18 wherein, in their coupled aspect, a structural characteristic 59 of door assembly 18 secures optical conductor 40 therewith.

One or more such structural characteristics 59 can function to secure light pipe 30 with door assembly 18. The structural characteristic 59 can be a component part, an integral piece, etc. The structural characteristic 59 can secure light pipe 30 and door assembly 18 with plastic and/or elastic forces, structural conformity, mechanical coupling, etc.

Importantly, while the structural characteristic 59 of drive door assembly 18 couples light pipe 30 securely with door assembly 18, light pipe 30 and door assembly 18 are coupled such that light pipe 30 can be readily, e.g., easily, quickly, with little effort, and without damage to either, decoupled therefrom.

In one embodiment, light pipe 30 has a key 57, which can be of integral construction with optical conductor 40 and/or appurtenant thereto. Key 57 functions with optical conductor 40 to couple the optical conductor 40 with the door assembly 18 in a configuration wherein end 42 is coupled with a first location on door assembly 18, e.g., proximate to position P' conforming to LED 25, and wherein end 41 is coupled with a second location on the door assembly 18, e.g., proximate to position P conforming to indicator 15.

Key 57 also functions to deter coupling optical conductor 40 with door assembly 18 in another configuration. Advantageously, this can deter improper installation of light pipe 30. Key 57 conforms with a structural feature 58, such as a recess, a lock mechanism, a detent, etc., of door assembly 18. Structural feature 58 functions with key 57 to couple light pipe 30 and the door assembly 18 in their proper configuration.

In one embodiment, light pipe 30 comprises one of a plurality of different light pipes, each for example correspondingly labeled by a distinctive (e.g., different, individual, etc.) label 43 (FIG. 4) and each having a distinctive key 57. In this embodiment, structural feature 58 is correspondingly distinctive and functions with key 57 to couple only the proper light pipe 30 for a particular door assembly 18, in their proper configuration.

With front panel 11 in place with case 16 (FIG. 1,2), light pipe 30 is configured wherein light from LED 25 enters optical conductor 40 at optical entry portal 45. Optical conductor 40 couples the light entering at optical entry portal 45 to optical exit portal 46. The light exits optical conductor 40 at optical exit portal 46 and is displayed as a luminous indication with indicator 15.

Exemplary Computer Housing: Multiple Drive Access

Figure 6:
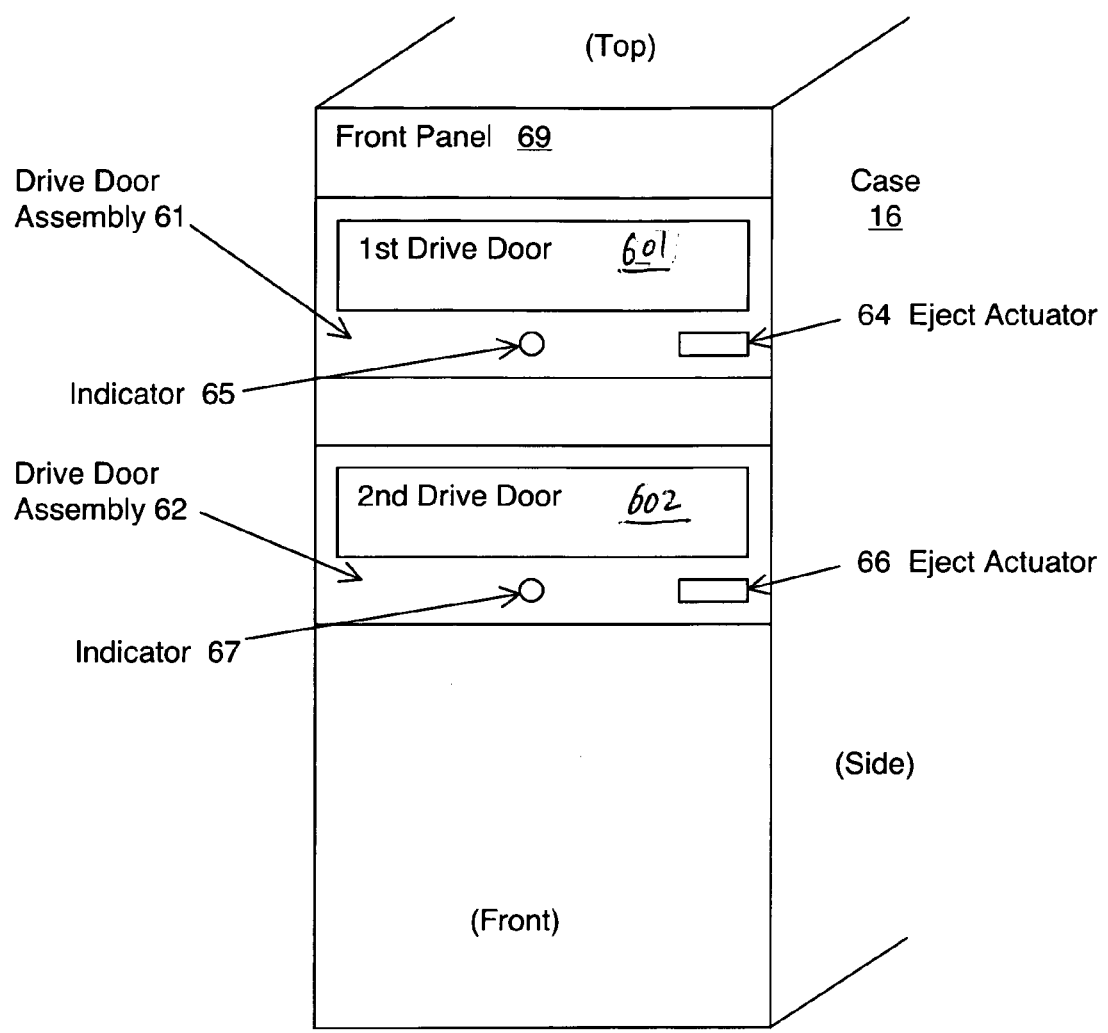
FIG. 6 depicts an exemplary computer housing with multiple drives installed, according to an embodiment of the present invention, from an outer perspective.

FIG. 6 depicts an exemplary computer housing 60 with multiple drive door assemblies 61 and 62 installed, according to an embodiment of the present invention, from an outer perspective. Computer housing 60 has a front panel 69. Front panel 69 couples with case 16 and functions as a protective front surface for computer housing 60, which allows users to access and interface with components such as drives, which are internal to the computer housing 60. Drive door assemblies 61 and 62 allow accessing and interfacing with internal drives and can be a component of, integral with, etc. front panel 69.

Drive door assembly 61 accesses a first internal drive. An eject actuator 64 interfaces with that internal drive to cause drive door 601 to operate. Indicator 65 displays a visual indication relating to the operation of that internal drive.

Drive door assembly 62 accesses a second internal drive. An eject actuator 66 interfaces with that internal drive to cause drive door 62 to operate. Indicator 67 displays a visual indication relating to the operation of that internal drive.

Figure 7:
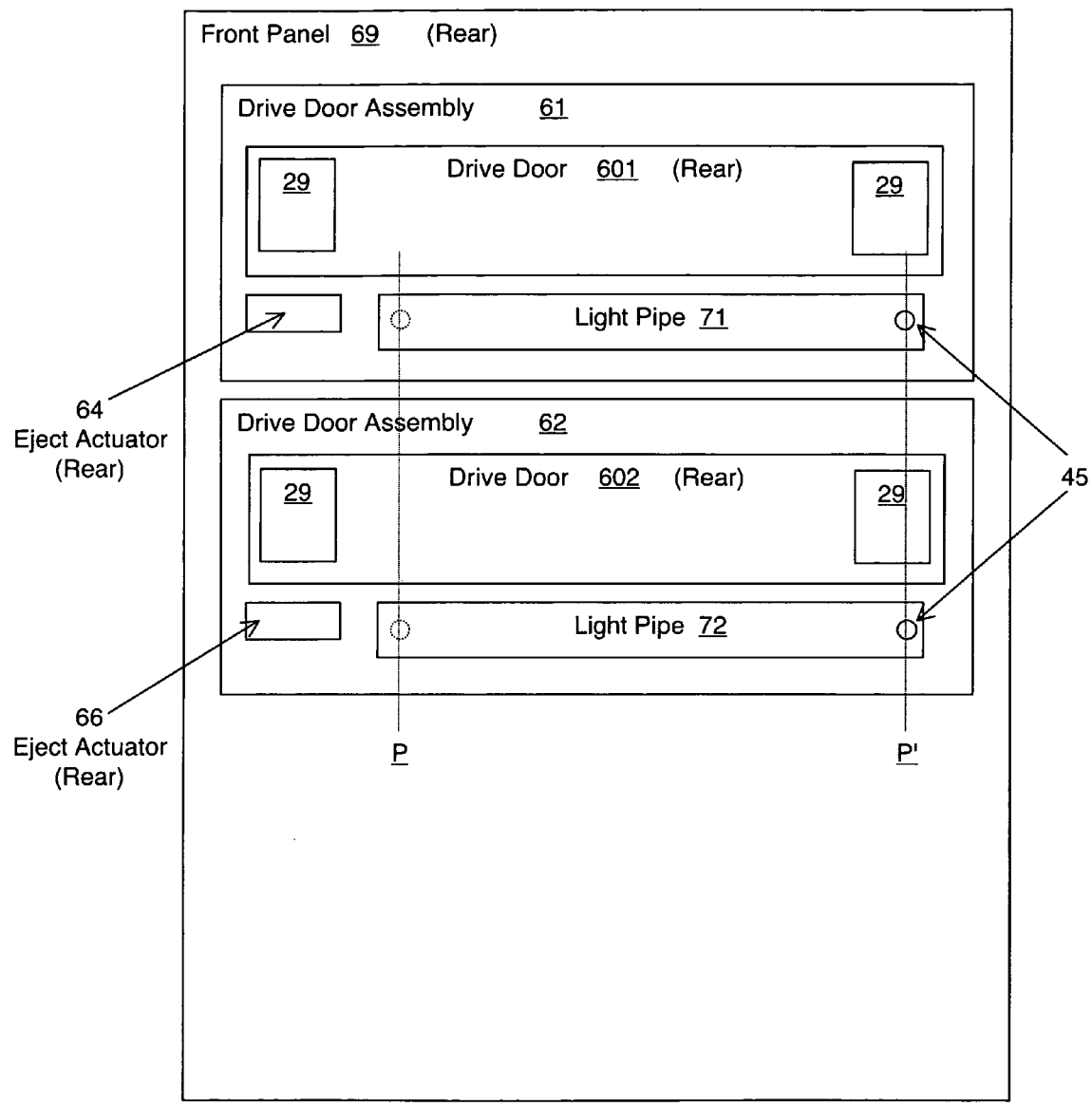
FIG. 7 depicts an exemplary front panel for a computer housing with multiple drives installed, according to an embodiment of the present invention, from a rear perspective.

FIG. 7 depicts exemplary front panel 69, according to an embodiment of the present invention, from a rear perspective, e.g., looking at a rear surface thereof, which would face towards the inside of case 16 and drives therein. The eject actuators 64 and 66 are respectively below drive doors 601 and 602. With front panel 69 in place with case 16, drive door assemblies 61 and 62 are positioned such that the rear of eject actuators 64 and 66 are respectively proximate to an ejection button of first and second drives (e.g., drive 22; FIG. 2). The proximity is sufficient for actuating the eject buttons responsive to user actions such as pressing the front accessible side (depicted in FIG. 6) of eject actuators 64 and 66.

Drive doors 601 and 602 have one or more components 29 such as ramps, with which it can be operated with the drives. Drive doors 601 and 602 can also be spring actuated, spring assisted, etc. and/or can function with other mechanical components (e.g., ledges, levers, cams, gears, surfaces, etc.), with electromechanical components, etc.

Drive door assemblies 61 and 62 respectively have a light pipes 71 and 72 for transmitting light emitted by LEDs to indicator 65 and 67 (FIG. 6). Light pipes 71 and 72 substantially conform, in one embodiment, to the exemplary light pipes described above with reference to FIGS. 3–5.

With front panel 69 in place with case 16, drive door assemblies 61 and 62 are positioned such that light pipes 71 and 72 conduct light emitted by LEDs conforming to, proximate to, etc. positions P' to be displayed with indicator 15 at positions P. From the perspective depicted, one end of light pipe 71 covers indicator 65 at position P and its other end faces a position P'. Light pipes 71 and 72 thus have lengths corresponding to the horizontal distance, with respect to front panel 69, between the LEDs of the internal devices and indicators 65 and 67 to allow the display of light from the internal drive LEDs with indicators 65 and 67.

Exemplary Process

Figure 8:
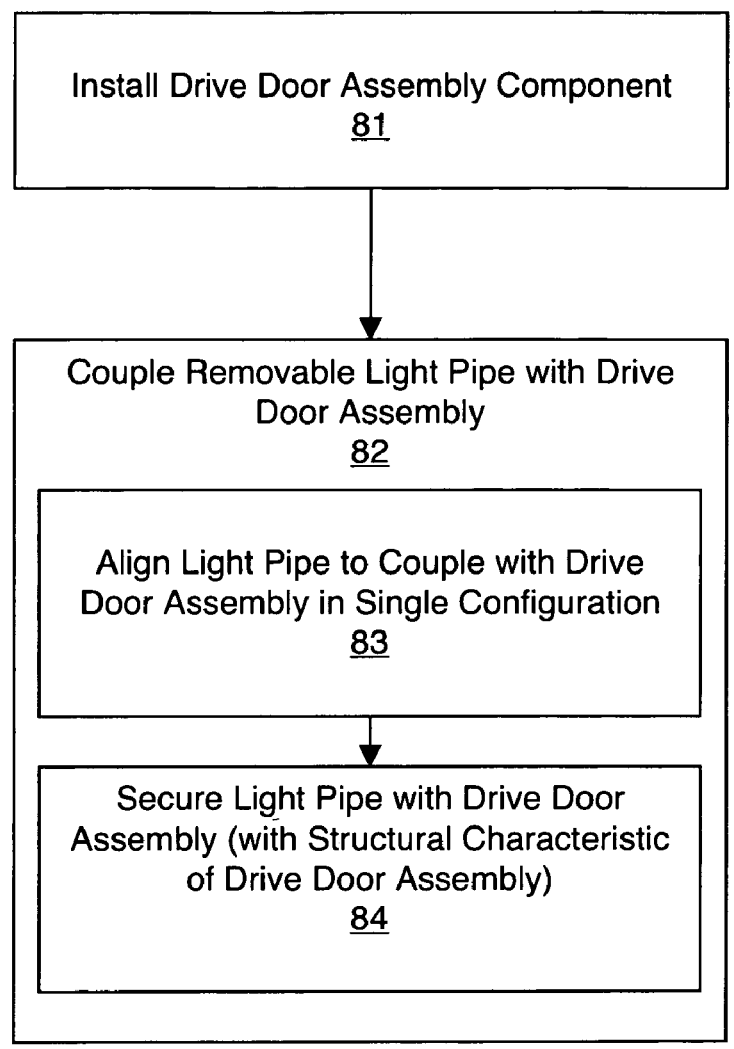
FIG. 8 is a flowchart of the steps in an exemplary method for assembling a computer housing, according to an embodiment of the present invention.

FIG. 8 is a flowchart of the steps in an exemplary process 80 for assembling a computer housing, according to an embodiment of the present invention. Process 80 begins with step 81, wherein a drive door assembly is installed into a component of the computer housing, such as a front or other panel.

In step 82, a light pipe is removably coupled with the drive door assembly. The light pipe can be readily decoupled with the drive door assembly if desired, without damage to either component. In one embodiment, the light pipe is removably coupled with the drive door assembly comprises steps 83 and 84.

In step 83, the light pipe is aligned to couple with the drive door assembly in a single configuration. For instance, coupling the light pipe with the drive door assembly in any other configuration is deterred, e.g., by one or more structural features of the light pipe and/or the drive door assembly.

In step 84, the light pipe is secured with the drive door assembly, such as with a structural characteristic of the drive door assembly, completing process 80. In one embodiment, one or more of the same or other structural characteristics align the light pipe to couple with the drive door assembly.

What is claimed is:

1. A computer housing, comprising:
   a drive door assembly; and
   a light pipe coupled to said drive door assembly, wherein said light pipe is removable, wherein said light pipe comprises:
   an optical conductor configured for removable coupling with said drive door assembly: and
   a key functioning with said optical conductor to couple said optical conductor with said drive door assembly in a configuration, wherein said key deters coupling said optical conductor with said door assembly in another configuration different from said configuration.

2. The computer housing as recited in claim 1 wherein a drive door of said drive door assembly opens for access to a drive comprising an optical drive.

3. The computer housing as recited in claim 1 wherein said door assembly comprises one of a plurality of door assemblies, wherein said light pipe device is configured for removably coupling with said one door assembly, and wherein said key further functions to deter coupling said optical conductor with another door assembly of said plurality of door assemblies.

4. The computer housing as recited in claim 1 wherein said optical conductor is integrated with said key.

5. The computer housing as recited in claim 1 further comprising a label for identifying said light pipe device.

6. The computer housing as recited in claim 5 wherein said label is integrated with said optical conductor.

7. The computer housing as recited in claim 5 wherein said label further identifies a drive door of said drive door assembly.

8. The computer housing as recited in claim 1 wherein said optical conductor removably couples with said door assembly wherein, in a coupled aspect, a structural characteristic of said door assembly secures said optical conductor with said door assembly.

9. A light pipe device for an drive door, comprising:
   an optical conductor with a first end and a second end wherein said optical conductor component is configured for removable coupling with a door assembly of said drive; and
   a key functioning with said optical conductor to couple said optical conductor with said door assembly in one configuration wherein said first end is coupled with a first location on said door assembly, wherein said second end is coupled with a second location on said door assembly, and wherein said key further functions to deter coupling said optical conductor with said door assembly in another configuration.

10. The light pipe device as recited in claim 9 wherein said door assembly comprises one of a plurality of door assemblies, wherein said light pipe device is configured for removably coupling with said one door assembly, and wherein said key further functions to deter coupling said optical conductor with another door assembly of said plurality of door assemblies.

11. The light pipe device as recited in claim 9 wherein said optical conductor is integrated with said key.

12. The light pipe device as recited in claim 9 further comprising a label for identifying said light pipe device.

13. The light pipe device as recited in claim 12 wherein said label is integrated with said optical conductor.

14. The light pipe device as recited in claim 12 wherein said label further identifies said drive door.

15. The light pipe device as recited in claim 9 wherein said optical conductor removably couples with said door assembly wherein, in a coupled aspect, a structural characteristic of said door assembly secures said optical conductor with said door assembly.

16. The light pipe device as recited in claim 9 wherein said drive door opens for access to a drive comprising, selectively, an optical drive and a magnetic drive.

17. A method for assembling a computer housing comprising:
   installing a drive door assembly into a structure of said computer housing; and
   coupling a light pipe to said drive door assembly wherein said light pipe is removably decoupleable with said drive door assembly, wherein said light pipe comprises:
   an optical conductor configured for removable coupling with said drive door assembly; and
   a key functioning with said optical conductor to couple said optical conductor with said drive door assembly in a configuration, and
   wherein said key deters coupling said optical conductor with said drive door assembly in another configuration different from said configuration.

18. The method as recited in claim 17, wherein said coupling comprises:
   aligning said light pipe to couple with said drive door assembly in a single configuration; and
   securing said light pipe with said drive door assembly according to said single configuration wherein a structural characteristic of said drive door assembly secures an optical conductor with said drive door assembly.

* * * * *